(12) United States Patent  (10) Patent No.: US 6,208,053 B1
Scott  (45) Date of Patent: Mar. 27, 2001

(54) ADJUSTABLE TORQUE HYSTERESIS CLUTCH

(75) Inventor: Craig Scott, Highland Park, IL (US)

(73) Assignee: MPC Products Corporation, Niles, IL (US)

( * ) Notice: Subject to any disclaimer, the term of this patent is extended or adjusted under 35 U.S.C. 154(b) by 0 days.

(21) Appl. No.: 09/385,529

(22) Filed: Aug. 30, 1999

(51) Int. Cl.$^7$ .................................................. H02K 49/02
(52) U.S. Cl. ..................... 310/105; 310/106; 310/103; 310/101; 310/92; 192/84.1; 192/84.3
(58) Field of Search .................................. 310/105, 106, 310/103, 78, 92, 93, 94, 96, 101; 192/84.31, 84.3, 84.1, 84.6; 188/267

(56) References Cited

U.S. PATENT DOCUMENTS

| Re. 23,101 | 4/1949 | Winther | 310/105 |
|---|---|---|---|
| 700,839 | 5/1902 | Sessions | 310/105 |
| 813,410 | 2/1906 | Eck | 310/191 |
| 859,826 | 7/1907 | Martinka | 310/184 |
| 896,868 | 8/1908 | Steckel | 310/105 |
| 908,707 | 1/1909 | Steckel | 310/105 |
| 912,504 | 2/1909 | Steckel | 310/105 |
| 996,253 | 6/1911 | Johnson | 310/191 |
| 1,171,134 | 2/1916 | Neuland | 310/106 |
| 1,271,401 | 7/1918 | Weydell | 310/106 |
| 1,424,769 | 8/1922 | Morrison | 310/103 |
| 1,519,417 | 12/1924 | Payne | 310/191 |
| 2,119,819 | 6/1938 | List | 310/93 |
| 2,120,352 | 6/1938 | Ericson | 310/93 |
| 2,206,696 | 7/1940 | Hall | 310/99 |
| 2,223,866 | 12/1940 | Beechlyn | 310/105 |
| 2,233,060 | 2/1941 | Parvin | 310/96 |
| 2,306,582 | 12/1942 | Winther | 310/105 |
| 2,333,458 | 11/1943 | Alexanderson | 310/95 |
| 2,393,211 | 1/1946 | Winther | 310/105 |
| 2,428,104 | 9/1947 | Winther | 310/105 |
| 2,454,364 | 11/1948 | Winther | 310/105 |
| 2,465,982 | 3/1949 | Winther | 310/105 |
| 2,659,021 | 11/1953 | Poliansky | 310/106 |
| 2,741,714 | 4/1956 | Regelman | 310/93 |
| 2,748,334 | 5/1956 | Miller | 318/831 |
| 2,807,772 | 9/1957 | Melentine | 322/50 |
| 2,817,029 | 12/1957 | Jaeschke | 310/96 |
| 2,902,612 | 9/1959 | Whearley | 310/105 |
| 2,949,552 | * 8/1960 | Benoit | 310/103 |

(List continued on next page.)

FOREIGN PATENT DOCUMENTS

| 1039614 | * 9/1958 | (DE) | H02K/49/00 |
|---|---|---|---|
| 3732766 | * 4/1988 | (DE) | H02K/49/00 |
| 62-213543 | * 9/1958 | (JP) | H01K/49/10 |
| 1661933 | * 7/1991 | (SU) | H02K/49/10 |

*Primary Examiner*—Burton Mullins
(74) *Attorney, Agent, or Firm*—Laff, Whitesel & Saret, Ltd.

(57) ABSTRACT

A hysteresis slip clutch having an adjustable stall torque is provided. The clutch components include first and second rotors, with a housing at least partially enclosing the rotors. An annular permanent magnet is rigidly mounted on the first rotor and an annular hysteresis sleeve is rigidly mounted to the second rotor. The first and second rotors are mounted within the housing such that the magnet and hysteresis sleeve are concentrically located and axially aligned with one another within the housing. In this orientation, magnetic flux from the magnet penetrates the hysteresis sleeve and magnetic hysteresis developed within the hysteresis sleeve acts to oppose relative angular motion between the first and second rotors. The magnetic hysteresis establishes a torque by which angular motion of the first rotor is transferred to the second. An annular magnetic shunt is adjustably mounted to the housing. The shunt is movable between a first position, remote from said hysteresis sleeve, wherein the magnetic flux within the hysteresis sleeve is substantially unaffected by the shunt, and a second position wherein a substantial amount of magnetic flux is diverted from said hysteresis sleeve to said shunt, thereby reducing the stall torque of the clutch.

11 Claims, 4 Drawing Sheets

U.S. PATENT DOCUMENTS

| | | | |
|---|---|---|---|
| 2,959,694 | 11/1960 | Hutson | 310/61 |
| 3,085,745 | 4/1963 | Auberger | 235/94 R |
| 3,215,874 | 11/1965 | Woodward | 310/105 |
| 3,599,305 * | 8/1971 | Aurich | 29/129.5 |
| 3,700,941 * | 10/1972 | Duncan | 310/105 |
| 3,974,408 | 8/1976 | Fehr | 310/103 |
| 4,146,805 | 3/1979 | Fehr | 310/103 |
| 4,186,320 | 1/1980 | Hillman | 310/93 |
| 4,190,794 | 2/1980 | Mikulic | 318/831 |
| 4,278,907 * | 7/1981 | Ladngraf et al. | 310/191 |
| 4,885,489 | 12/1989 | Stuhr | 310/78 |
| 5,064,029 | 11/1991 | Araki | 310/103 |
| 5,096,024 | 3/1992 | Wu | 188/267 |
| 5,154,623 | 10/1992 | Kuwahara | 188/164 |
| 5,158,279 * | 10/1992 | Laffey et al. | 192/110 R |
| 5,206,555 | 4/1993 | Morris | 310/105 |
| 5,238,095 * | 8/1993 | Pedu | 310/105 |
| 5,483,114 * | 1/1996 | Fenner | 310/75 D |
| 5,581,139 | 12/1996 | Toukola | 310/105 |
| 5,600,194 | 2/1997 | Toukola | 310/105 |
| 5,675,203 * | 10/1997 | Schulze et al. | 310/113 |
| 5,714,820 | 2/1998 | Mitsuhashi | 310/105 |
| 5,804,897 | 9/1998 | Kuwahara | 310/77 |
| 5,848,678 * | 12/1998 | Johnston et al. | 192/21.5 |

* cited by examiner

ADJUSTABLE TORQUE HYSTERESIS CLUTCH

BACKGROUND OF THE INVENTION

The present invention relates to a hysteresis clutch having an adjustably set stall torque that remains constant over a wide temperature range.

In many DC motor applications it is desirable to drive a mechanical load at a constant speed between predefined mechanical limits. In most cases it is possible to drive the load at a constant speed with relatively low torque when the path of the load is unobstructed. However, if significant resistance to the motion of the load is encountered, or when the load reaches its end of travel and encounters a mechanical stop, the torque on the output shaft of the motor rises dramatically. If the torque increases past a certain critical value (the motor stall torque) the motor will stop turning and the load will cease moving. In many cases it is desirable to maintain a constant torque applied against the load in order to firmly hold the load against mechanical stops after the load has reached the end of travel. A stable constant torque output, however, is difficult to achieve with a stalled DC motor. The stall torque of the motor varies as a function of motor temperature, and the excess current drawn by the stalled motor causes the motor temperature to increase rapidly. Thus, when the motor is stalled, the output torque may change significantly as the windings of the motor heat up.

Slip clutches of various designs are often provided to surmount this problem. A slip clutch is fitted to the output shaft of a DC motor between the motor and the load. A slip clutch comprises an input shaft adapted to be coupled to the output shaft of the motor, and an output shaft adapted to drive a load. The clutch interface acts to couple the driven clutch input shaft to the clutch output shaft to drive a load. Under normal conditions, the output shaft of the clutch rotates one-to-one with the input shaft. However, if the load on the output shaft exceeds a certain amount, the output shaft of the clutch breaks free of the input shaft, and the load side of the clutch stops moving while the motor side continues to rotate. If the torque on the output side of the clutch is reduced below the stall torque, the clutch will re-engage and the load will again begin to move. Ideally, while the output side of the clutch is stalled and the motor continues to turn, a uniform holding torque, or stall torque, will nonetheless be coupled to the output side of the clutch to maintain a constant force against the load.

An example of an application where such an arrangement is desirable is in the deployment of an antenna on a satellite or spacecraft. Typically, a DC motor will drive the antenna support hardware from a retracted position to an extended position. The extended position will generally be defined by mechanical stops, beyond which the antenna support hardware may not be extended further. As the antenna is deployed, the DC motor will generally drive the antenna support hardware at a constant speed and at constant torque. However, when the antenna reaches the point of full extension, the support hardware is driven against mechanical stops which prevent further extension of the antenna. At this point the torque on the output shaft of the motor rises substantially, and the motor stalls. Once the antenna reaches full extension, it is desirable to apply a constant torque against the support hardware to maintain the antenna in a fully deployed position.

In an application such as deploying a satellite antenna, the maintaining torque must be very precisely controlled. Ordinarily a slip clutch would be expected to be well suited for such a task, however, prior art slip clutches have not been able to meet the rigorous demands of space borne applications. On board a satellite, components are subjected to temperatures ranging from approximately −60° C. to +150° C. Maintaining a constant stall torque over such an extreme temperature range is beyond the capability of most prior art slip clutches. Friction clutches, for example, are especially prone to fluctuations in stall torque due to temperature changes as a result of the thermal expansion and contraction of mechanical parts.

Magnetic, or hysteresis type clutches are less prone to temperature induced variations in stall torque, however, prior art hysteresis slip clutches have been subject to other limitations that make them equally unsuitable for use on space vehicles, and in other demanding applications. For example, the internal inertia of the slip clutch is an important factor that must be considered in the design of an antenna deployment system for a space vehicle. Weight is a critical design criterion in satellite systems. If the drive mechanism for deploying the antenna is too heavy, and the spinning rotor of the DC motor or the output rotor of a slip clutch develops too much angular momentum, the size of the mechanical stops at the antenna support structure's end of travel must be increased in order to absorb the shock when the antenna support hardware is driven at full speed into the stops. In contrast, a smaller motor or slip clutch that develops less angular momentum requires less substantial stops and thereby provides a savings in the overall weight of the antenna deployment system.

In addition to supplying a slip clutch having the ability to maintain constant stall torque over a broad range of temperature extremes, it is also desirable to provide a slip clutch wherein the actual stall torque is adjustable. Manufacturing tolerances inevitably result in slip clutches—including those of identical design—having slightly different stall torques from one unit to the next. This result is unacceptable for those applications wherein a very precise pre-defined stall torque is required.

In light of the various shortcomings of prior art slip clutch designs, there is a need for an improved hysteresis clutch. The improved clutch must provide a mechanism for adjusting the stall torque of the output shaft of the clutch such that the clutch may be pre-set to stall when the torque on the output shaft of the clutch reaches a designated magnitude. Further, such an improved adjustable hysteresis clutch must maintain a constant stall torque on the output shaft of the clutch over a wide temperature range, for example in the range between −60° C. to +150° C. Finally, such an adjustable hysteresis clutch must have low inertia such that rotation of the clutch output may be arrested with relatively little effort.

SUMMARY OF THE INVENTION

An adjustable torque hysteresis clutch is provided for releasably coupling the output shaft of a motor to a mechanical load. The clutch is designed to supply an adjustable stall torque to the load. Thus, when the torque present on the output shaft of the clutch is less than the stall torque of the clutch, the output shaft of the clutch will rotate directly with the output shaft of the motor. However, when the torque on the output shaft exceeds the stall torque of the clutch, the output shaft stops rotating, while the motor and the and input side of the clutch continue to turn. Further, while the output side of the clutch is stalled, a stable stall torque is applied to the output shaft of the clutch. Thus, the clutch is capable of maintaining a steady torque on the load under stall conditions. Advantageously, the clutch of the present invention is able to maintain such a steady output torque over a very wide temperature range from about −60° C. to about +150° C. as would likely be encountered aboard a space vehicle.

In one embodiment of the invention, the novel hysteresis clutch generally comprises a cylindrical housing extending from the output side of a DC motor A first rotor is rotatably mounted within the housing and driven by the output shaft of the motor. A second rotor is also rotatably mounted within the housing, and is adapted to rotate both with the first rotor, and relative thereto. An annular hysteresis sleeve is secured to the first rotor, and an annular permanent magnet is secured to the second rotor. The magnet and hysteresis sleeve form concentric overlapping rings. The permanent magnet and the hysteresis sleeve are arranged so that magnetic flux from the magnet enters the hysteresis sleeve. When the first rotor is rotated, magnetic hysteresis opposes relative angular motion between the hysteresis sleeve and the permanent magnet. Thus, as the first rotor is turned by the motor, a torque is generated between the rotors, such that rotational motion is imparted from the first rotor to the second.

An axially adjustable magnetic shunt is provided to control the stall torque of the clutch. The shunt is positionable to alter the magnetic flux density within the hysteresis sleeve. The magnitude of the stall torque is proportional to the magnetic flux density within the hysteresis sleeve. When the shunt is in near proximity to the hysteresis sleeve, a substantial amount of magnetic flux is diverted from the hysteresis sleeve to the shunt. Thus, if the shunt is positioned nearer the hysteresis sleeve, and more flux is diverted from the sleeve, the stall torque is reduced. Conversely, when the shunt is moved further away from the hysteresis sleeve, the magnetic flux density within the hysteresis sleeve is increased and the stall torque of the clutch is increased.

DETAILED DESCRIPTION OF THE PREFERRED EMBODIMENT

Figure 1:
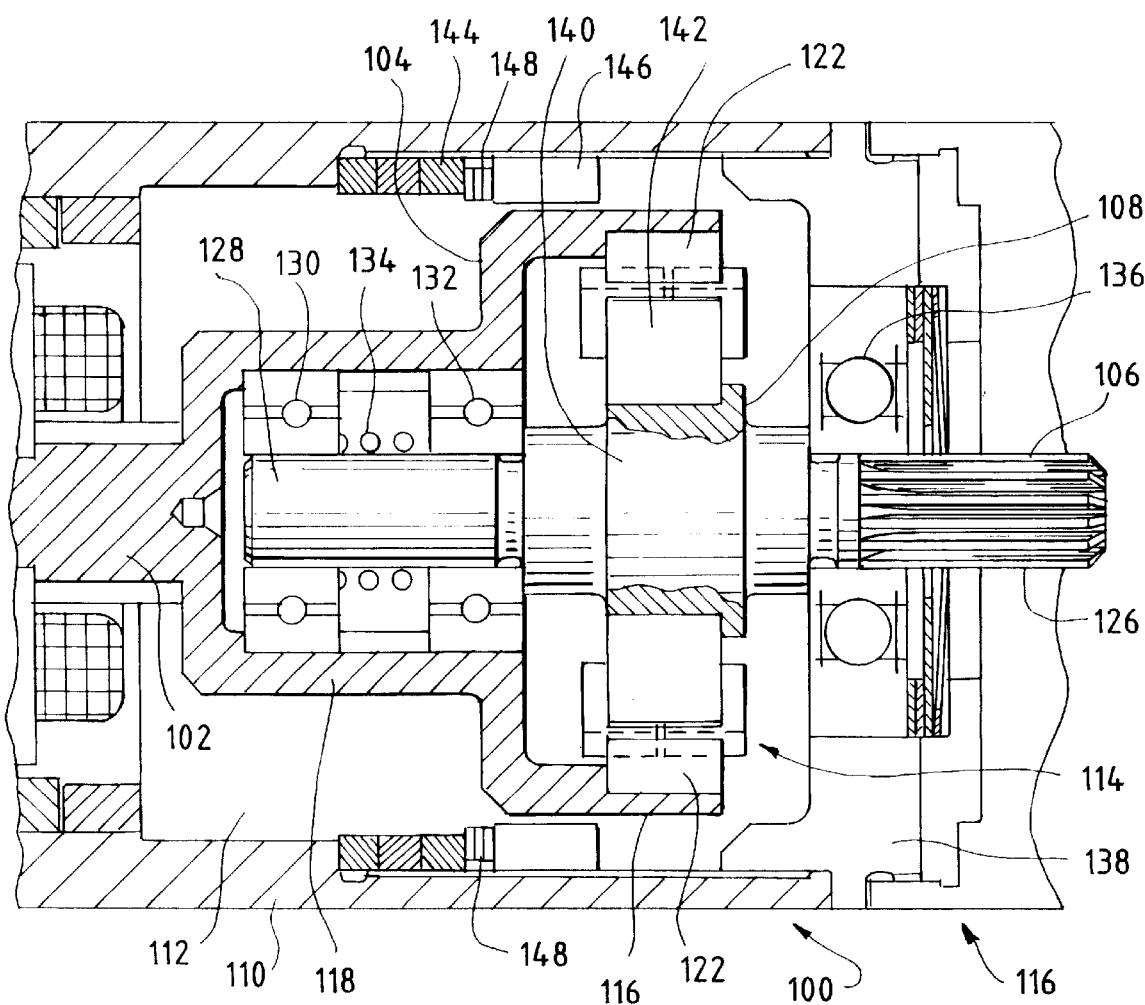
FIG. 1 is a cross sectional view of an adjustable hysteresis clutch according to the preferred embodiment of the present invention, adjusted for maximum stall torque.
Figure 2:
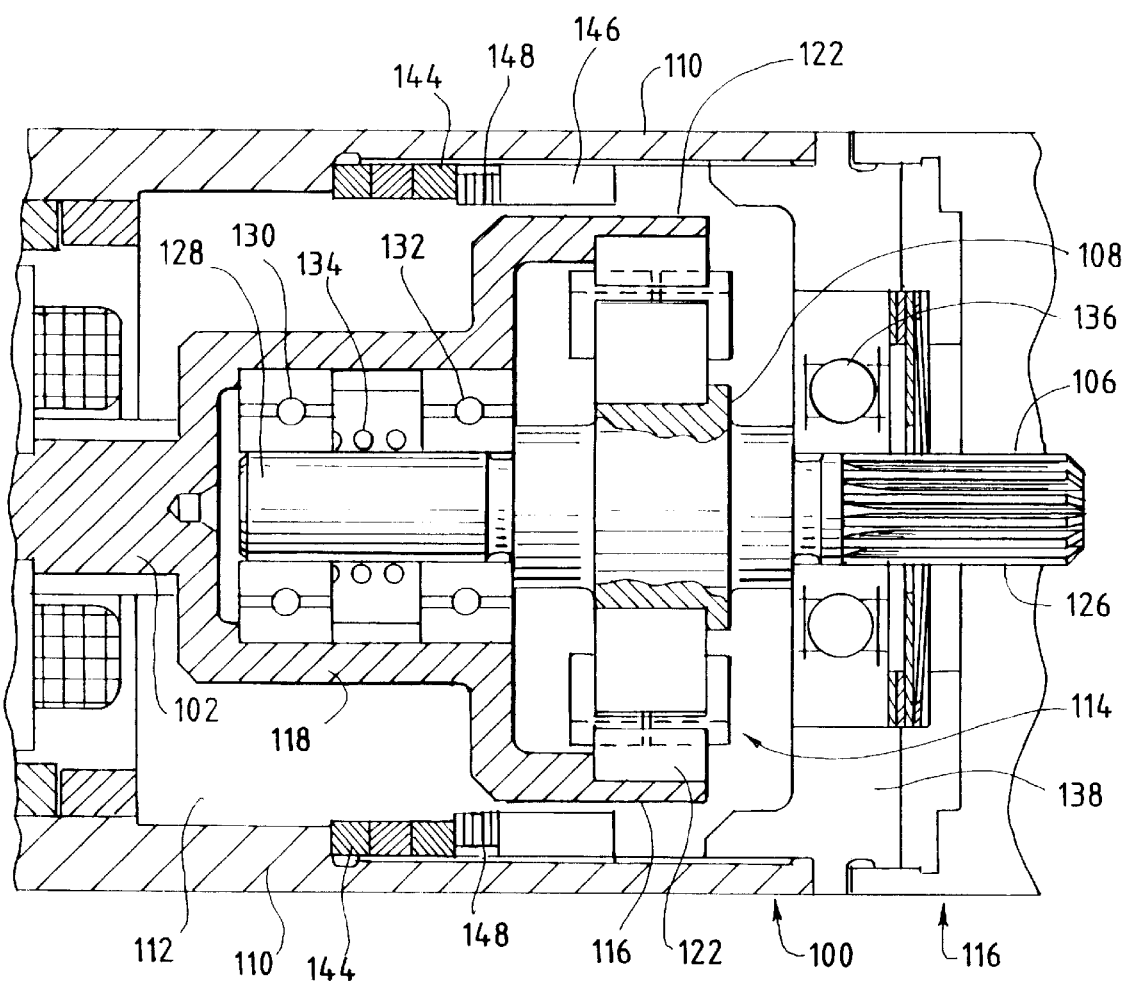
FIG. 2 is a cross sectional view of the adjustable hysteresis clutch of FIG. 1 adjusted for minimum stall torque.

Turning first to FIGS. 1 and 2, an adjustable hysteresis clutch according to the preferred embodiment of the invention is shown at 100. The adjustable hysteresis clutch 100 comprises a first input shaft 102 which is integrally formed with a first rotor 104, and a second output shaft 106 integrally formed with a second rotor 108. In the embodiment shown in the drawings, the first shaft 102 comprises the input, or driven shaft, and second shaft 106 represents the output shaft of the clutch. Thus, the input shaft 102 is coupled to, or directly formed with, the rotary output shaft of a motor. The output shaft 106 is to be coupled to a gearbox, sprocket, or some other drive mechanism for imparting motion to a load. While the arrangement shown in the FIGS. is preferred, the hysteresis clutch of the present invention is bi-directional, and the input and output roles of shafts 102, 106 may be reversed with no adverse affects to the operation of the clutch 100. In other words, it is possible to couple shaft 106 to the output shaft of a motor, and drive a load with shaft 102.

Returning to the preferred embodiment, however, hysteresis clutch 100 is integrally formed with a DC motor. In FIGS. 1 and 2 only the output end of the motor is shown. Input shaft 102 forms an extension of the output shaft of the motor shaft. Similarly, the motor housing 110 extends past the end of the motor and defines a cylindrical space 112 in which the clutch mechanism resides.

The driven input shaft 102 extends from the DC motor into the cylindrical space 112. The driven rotor 104 forms a concave support member having an open end 114 facing the output side of the hysteresis clutch 100. As will be discussed in more detail below, the concave open end 114 of the first rotor 104 defines a first, narrow diameter cylindrical space 118, and a second wider diameter cylindrical space 120. A hysteresis sleeve 122 is mounted within the annular sidewall of the wider diameter portion of the first rotor. The hysteresis sleeve 122 is an annular ring formed of a semi-permanent magnetic alloy such as ALNICO-VII.

As noted, the output rotor 108 is adapted to fit partially within the concave opening at the end of the driven rotor 104. The output rotor 108 includes an axially located output shaft 106 which extends in both directions from the output rotor. An internal end of the output shaft 128 is configured to be inserted into the narrow cylindrical space 118 defined by the hollow open end of the input rotor 104. First and second support bearings 130, 132 are packed within the narrow diameter space 118, between the driven rotor 104 and the internal end of the output shaft 128. Bearings 130, 132 act to support and align the output rotor 108 with the driven rotor 104, while allowing free rotation of the output rotor relative to the driven rotor 104. A biasing spring 134 is placed between support bearings 130, 132 to hold the bearings in place and retain the proper axial alignment between the two rotors. An output bearing 136 supports the external end of the output shaft 126, and an endplate 138 covers the end of the motor housing 110 to enclose the entire assembly. A center portion of the output rotor 140 has an increased diameter and carries an annular permanent magnet 142. The bearings 130, 132, 136, the spring 134, and endplate 138 all act to maintain alignment between the output rotor 108 and the input rotor 104 such that the permanent magnet 142 is held substantially opposite the hysteresis sleeve 122.

Supported by the output bearing 136 and internal bearings 130, 132, both the driven rotor 104 and the output rotor 108 are free to rotate relative to the housing 110, and, when the torque applied to the output rotor exceeds the stall torque of the clutch 100, the output rotor is free to rotate relative to the driven rotor. An annular magnetic shunt 146 is mounted directly to the inner diameter surface of housing 110. The magnetic shunt forms a circular ring of soft ferrous material such as 416 steel. The diameter and thickness of the magnetic shunt is such that it will fit between the driven rotor 104 and the inner surface of housing 110, opposite the hysteresis sleeve 122. A first set of threads 148 are formed at one end of the shunt 146. A mating threaded surface 150 is formed on the inner surface of housing 110. Thus, the magnetic shunt 146 may be screwed onto the threads formed in the housing to mount the shunt within the housing. Furthermore, by rotating the shunt clockwise, or counterclockwise on the mounting threads, the shunt may be axially advanced and withdrawn relative to the hysteresis sleeve 122. In a forwardmost position, as shown in FIG. 2, the magnetic shunt partially overlaps the hysteresis 122 sleeve in the axial direction. In the retracted position shown in FIG. 1, there is no overlap between the magnetic shunt 142 and the hysteresis sleeve 122. The threaded nature of the shunt mounting allows the shunt to be continuously adjusted between these two extreme positions. Once in the desired position, however, the shunt will stay in place until manually rotated to another position.

Figure 3:
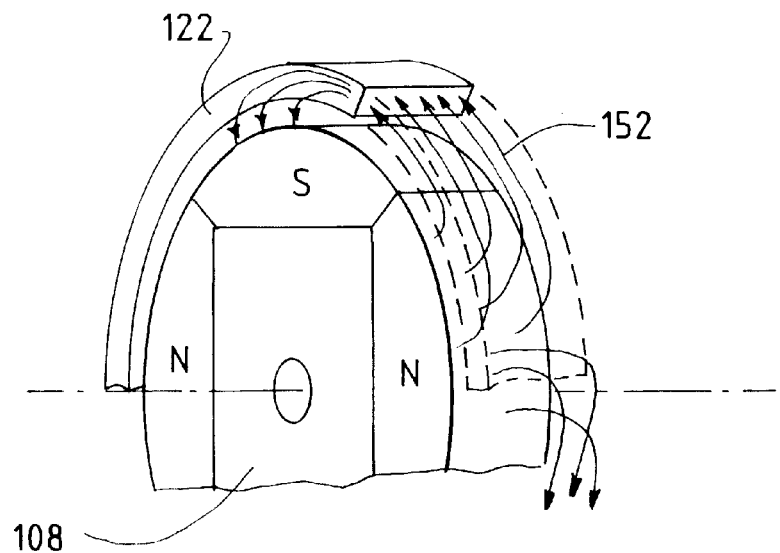
FIG. 3 is a partial perspective view of an annular permanent magnet of an output rotor and hysteresis sleeve of a driven rotor of the adjustable hysteresis clutch of FIG. 1, showing the path of the magnetic flux lines associated therewith.
Figure 4:
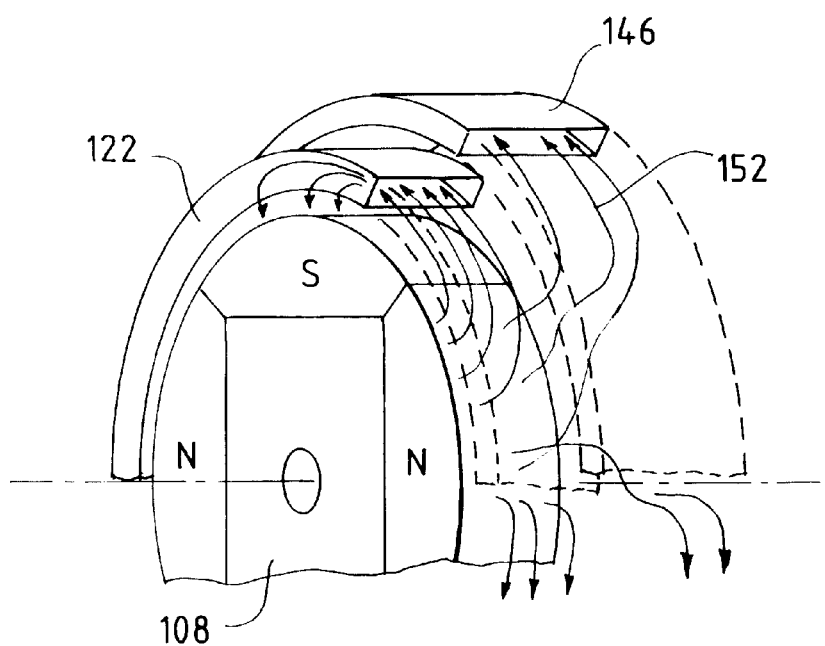
FIG. 4 is a partial perspective view of the annular permanent magnet and hysteresis sleeve as shown in FIG. 3, further including a magnetic shunt positioned to divert a significant number of the magnetic flux lines.

Operation of the hysteresis clutch of the present invention is best understood with reference to FIGS. 3 and 4. The poles of the permanent magnet rotor are arranged alternatively around the circumference of the output rotor. In the preferred embodiment shown in FIGS. 3 and 4, the permanent magnet 142 is formed having four poles equally spaced around the circumference of the output rotor 108. Additional poles may be added. Additional poles will vary the amount of relative motion between the driven rotor and the output necessary to cause a permanent angular displacement between the two rotors. If the relative motion is less than the minimum threshold, the two rotors will spring back to their original relative positions upon the removal of the differential torque giving rise to the original angular displacement. In general, as more poles are added, the minimum relative angular displacement threshold will be reduced.

As shown in both FIGS. 3 and 4, magnetic flux lines extend from the north pole faces of permanent magnet 142, enter the magnetic sleeve 122 and then terminate on the south magnetic pole faces. The magnetic flux lines passing through the hysteresis sleeve establish eddy currents within the hysteresis sleeve which resist changes to the magnetic field within the hysteresis sleeve. Thus, if the hysteresis sleeve is rotated by turning the first rotor, magnetic hysteresis will act to pull the magnet, and therefore the second rotor, around with the first rotor in order to maintain the physical relationship between the hysteresis sleeve and the permanent magnet. Thus, as the driven rotor rotates the hysteresis sleeve, a torque is developed tending to rotate the output rotor. The output rotor will rotate with the driven rotor until the torque applied to the output shaft 106 exceeds the maximum torque between the driven rotor 104 and the output rotor 108. The point where the magnitude of the output torque applied to the output shaft 106 exceeds the maximum torque between the driven rotor 104 and output rotor 108 represents the stall torque of the clutch. Once the torque on the output shaft exceeds this value, the output shaft and output rotor will stop rotating, regardless of the continued rotation of the driven rotor.

The magnitude of the stall torque is proportional to the number of magnetic flux lines 152 that penetrate the hysteresis sleeve. The greater the number of flux lines entering the hysteresis sleeve, the greater is resistance to relative motion between the two rotors. Thus, increasing the magnetic flux density within the hysteresis sleeve increases the stall torque and reducing the flux density reduces the stall torque.

The magnetic shunt 146 is provided for adjusting the magnetic flux density within the hysteresis sleeve 122. In FIG. 3, the hysteresis clutch is shown with the magnetic shunt 146 fully retracted to the position shown in FIG. 1. With the shunt in this position, substantially all of the magnetic flux lines from the permanent magnet enter the hysteresis sleeve and the stall torque is maximized. However, as shown in FIG. 4, when the magnetic shunt is moved axially forward to partially overlap the hysteresis sleeve, a number of the magnetic flux lines are diverted from the hysteresis sleeve into the shunt. Thus, the number of magnetic flux lines entering the hysteresis sleeve is significantly reduced, and the magnitude of the stall torque is correspondingly reduced. By adjusting the position of the shunt, the stall torque can be precisely controlled. An advantage of this arrangement is that the stall torque may be very accurately set to any desired value regardless of manufacturing tolerances.

Furthermore, the stall torque may be precisely maintained over extreme temperature variations, such as those encountered on orbiting satellites.

Figure 5:
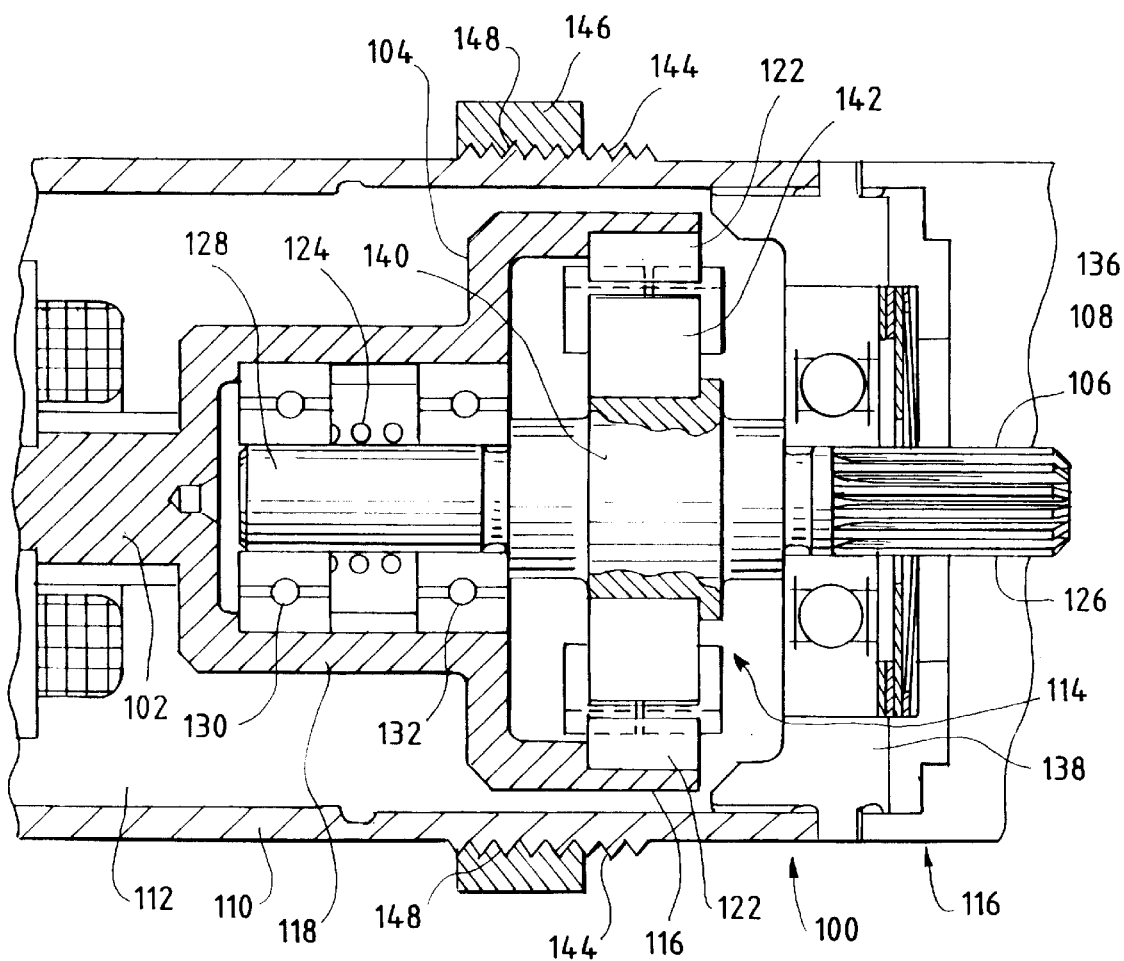
FIG. 5 is a cross sectional view of an alternative embodiment of an adjustable hysteresis clutch with a threaded magnetic shunt.

It should be noted that while the embodiment disclosed in FIGS. 1–4 is preferred, a number of alternate embodiments may also be provided. In one alternative embodiment, for example, shown in FIG. 5, the first and second rotor assemblies are identical to those shown in FIGS. 1 and 2, and like elements have been identified by the same reference numbers. In this embodiment the housing 110 may be formed of a non-magnetic material such as plastic, and the geometry of the housing is changed such that the inner diameter of the housing is much closer to the outer diameter of driven rotor 104. In this embodiment, the outer diameter surface of the housing is formed with shunt receiving threads 144 and the magnetic shunt formed with internal mating threads 148 is mounted on the outside of the housing. In this arrangement it is important that the geometry of the housing is such that the shunt, though separated by the non-magnetic housing, may be brought into sufficiently close proximity with the hysteresis sleeve to divert a significant amount of magnetic flux so as to have an impact on the clutch stall torque. In the previous embodiment, adjustment of the magnetic shunt can only be accomplished by removing the end plate 138 to access the adjustable shunt. However, the alternative arrangement provides the advantage of allowing axial adjustment of the magnetic shunt from outside the clutch assembly.

It should be noted that other changes and modifications to the present invention may be made by those of ordinary skill in the art without departing from the spirit and scope of the present invention which is set out in more particular detail in the appended claims. Furthermore, those of ordinary skill in the art will appreciate that the foregoing description is by way of example only, and is not intended to be limiting of the invention as described in such appended claims.

What is claimed is:

1. A hysteresis slip clutch having an adjustable stall torque comprising:

a first rotor and a second rotor;

an annular permanent magnet rigidly mounted on said first rotor and an annular hysteresis sleeve rigidly mounted to said second rotor, said first and second rotors mounted such that said magnet and hysteresis sleeve are concentrically located and axially aligned so that magnetic flux from said magnet penetrates said hysteresis sleeve and magnetic hysteresis developed within said hysteresis sleeve opposes relative angular motion between said first and second rotors;

said second rotor comprising a concave support member and a first annular sidewall defining a first cylindrical space within said concave support member adapted at its distal end to support the hysteresis sleeve in a manner allowing said first rotor to be partially inserted into said concave support member to a point where the permanent magnet is in axial alignment with the hysteresis sleeve and a second annular sidewall formed by said concave support member defining a second cylindrical space;

an internal shaft extension formed on said first rotor, insertable into said second cylindrical space;

support bearings disposed between said internal shaft extension and the second annular sidewall, said support bearings allowing said first rotor to rotate freely relative to said second rotor; and an annular magnetic shunt adjustably mounted relative to hysteresis sleeve and permanent magnet, said shunt being movable between a first position remote from said hysteresis sleeve and magnet wherein said magnetic flux is substantially unaffected by said shunt, and a second position wherein a substantial amount of magnetic flux is diverted from said hysteresis sleeve to said shunt.

2. The hysteresis clutch of claim 1 further comprising a housing at least partially enclosing the first and second rotors.

3. The hysteresis clutch of claim 2 further comprising a threaded connection between said shunt and said housing whereby rotation of said shunt relative to said housing changes the axial position of said shunt relative to said hysteresis sleeve and magnet.

4. The hysteresis clutch of claim 3 wherein said threaded connection comprises a first threaded surface formed on an internal surface of said housing, and a second threaded surface formed on an outer diameter surface of said annular magnetic shunt.

5. An adjustable torque hysteresis for the releasably coupling an output shaft of a motor to a mechanical load, the clutch comprising:

a housing;

a first rotor rotatably mounted within said housing and driven by the output shaft of the motor;

a second rotor rotatably mounted within said housing, adapted to rotate with, and relative to, said first rotor;

an annular hysteresis sleeve secured to the first rotor, and an annular permanent magnet secured to the second rotor, said magnet and hysteresis sleeve forming concentric overlapping rings whereby magnetic flux from said magnet enters said hysteresis sleeve, and magnetic hysteresis within said hysteresis sleeve generates a torque acting against the second rotor when the first rotor is rotated, such that the first rotor imparts rotation to the second rotor; and an axially adjustable magnetic shunt mounted external to the housing and comprising an annular ring of soft magnetic material threadedly mounted to said housing whereby the axial position of the shunt relative to the hysteresis sleeve may be engaged by spinning the shunt relative to the housing, said axially adjustable magnetic shunt being positionable to alter the magnetic flux density within said hysteresis sleeve, thereby altering the maximum magnitude of the torque transferred to the second rotor.

6. The adjustable torque hysteresis clutch of claim 5 wherein the annular permanent magnet comprises two pairs of magnetic poles alternatively arranged around the circumference thereof.

7. The adjustable torque hysteresis clutch of claim 5 wherein said housing forms an extension from a motor housing enclosing said motor.

8. The adjustable torque hysteresis clutch of claim 5 wherein said magnetic shunt is continuously adjustable between a first position wherein said the magnetic flux entering said hysteresis sleeve is substantially unaffected by said shunt, and a second position wherein a substantial amount of magnetic flux is diverted from the hysteresis sleeve into said shunt.

9. The adjustable torque hysteresis clutch of claim 5 wherein said magnetic shunt is continuously adjustable between a first position wherein the magnitude of the maximum torque transferred from the first rotor to the second rotor is maximized, and a second position wherein the maximum torque transferred from the first rotor to the second rotor is minimized.

10. A hysteresis slip clutch having an adjustable stall torque comprising:

a first rotor and a second rotor, and a housing at least partially enclosing the first and second rotors;

an annular permanent magnet rigidly mounted on said first rotor and an annular hysteresis sleeve rigidly mounted to said second rotor, said first and second rotors mounted such that said magnet and hysteresis sleeve are concentrically located and axially aligned so that magnetic flux from said magnet penetrates said hysteresis sleeve and magnetic hysteresis developed within said hysteresis sleeve opposes relative angular motion between said first and second rotors;

an annular magnetic shunt adjustably mounted relative to hysteresis sleeve and permanent magnet, said shunt being movable between a first position remote from said hysteresis sleeve and magnet wherein said magnetic flux is substantially unaffected by said shunt, and a second position wherein a substantial amount of magnetic flux is diverted from said hysteresis sleeve to said shunt; and an end plate mounted on an output end of said housing, an output bearing mounted within said endplate, and an output shaft segment extending from said first rotor supported by said output bearings and extending through said endplate.

11. A hysteresis slip clutch having an adjustable stall torque comprising:

a first rotor and a second rotor; and a housing at least partially enclosing the first and second rotors;

an annular permanent magnet rigidly mounted on said first rotor and an annular hysteresis sleeve rigidly mounted to said second rotor, said first and second rotors mounted such that said magnet and hysteresis sleeve are concentrically located and axially aligned so that magnetic flux from said magnet penetrates said hysteresis sleeve and magnetic hysteresis developed within said hysteresis sleeve opposes relative angular motion between said first and second rotors;

an annular magnetic shunt adjustably mounted relative to hysteresis sleeve and permanent magnet, said shunt being movable between a first position remote from said hysteresis sleeve and magnet wherein said magnetic flux is substantially unaffected by said shunt, and a second position wherein a substantial amount of magnetic flux is diverted from said hysteresis sleeve to said shunt; and a threaded connection between said shunt and said housing whereby rotation of said shunt relative to said housing changes the axial position of said shunt relative to said hysteresis sleeve and magnet, said threaded connection comprising a first threaded surface formed on an internal surface of said housing, and a second threaded surface formed on an outer diameter surface of said annular magnetic shunt.

* * * * *